Nov. 17, 1964  R. D. STOLTE  3,157,194
INTERLOCK MECHANISM
Filed Sept. 21, 1962  2 Sheets-Sheet 1

ROBERT D. STOLTE
INVENTOR
HUEBNER & WORREL
ATTORNEYS
BY
Richard M. Worrel

ROBERT D. STOLTE
INVENTOR
HUEBNER & WORREL
ATTORNEYS

United States Patent Office 3,157,194
Patented Nov. 17, 1964

3,157,194
INTERLOCK MECHANISM
Robert D. Stolte, Fresno, Calif., assignor to Gas Tools, Inc., Fresno, Calif., a corporation of California
Filed Sept. 21, 1962, Ser. No. 225,284
6 Claims. (Cl. 137—351)

The present invention relates to an interlock mechanism between a vehicle brake system and a manually controllable valve on the vehicle and more particularly to such a mechanism for automatically controlling the valve incident to manipulation of the brakes.

Liquid petroleum gas tank trucks employed for delivering such gas to consumers employ a manually operable main outlet valve to control the discharge of gas from the tank. The main outlet valve provides connection for a discharge hose and nozzle arrangement through a liquid pump and metering mechanism carried on the vehicle. The valve affords a dual safety control which automatically closes upon a predetermined pressure differential between fluid in the tank and in the discharge hose and also closes upon a predetermined increase in the volume of fluid flow through the valve. The operation of this valve is more adequately described and is the subject of U.S. Patent No. 2,834,377.

The brake system employed on liquid petroleum delivery trucks incorporates a safety brake locking device which consists of an electrically energized pressure sensitive valve in the main brake line immediately behind a power booster brake mechanism which is effective to hold the brakes in an applied position until the valve is turned off and the brakes are released. This valve is commonly known as a Mico Brake Lock Valve which is actuated by an electrical switch located on the dashboard of the cab of the truck. The Mico Brake lock acts as a parking brake in the service brake system to hold the brakes in an applied position while the operator is making a delivery from the tank truck or when the tank truck is being filled at a bulk station.

The usual practice is for the operator to switch the Mico Brake switch on, depress the brake pedal an amount sufficient to complete the electrical circuit to the Mico Brake lock which blocks the return of hydraulic fluid from the brakes to hold them in an applied position. The operator then manually opens the main outlet valve from the tank which is usually located on the lefthand, or driver's side, of the truck and walks to the righthand side of the truck to actuate the delivery pump and observe the fluid meter as the delivery of gas is being made. After delivery, the above procedure is reversed by closing the nozzle and replacing the nozzle and hose on the vehicle, de-energizing the pump, closing the main outlet valve and re-entering the cab. The Mico Brake lock switch is then turned off and the brake pedal depressed to open the return line through the Mico Brake lock to release the brakes.

In following the above procedure, the operator is assured that the brakes are set only if sufficient pressure is developed in the brake system to close the electrical circuit to the brake lock. Frequently with this system, the operator merely taps the brake pedal lightly in his haste to make a speedy delivery and does not depress the pedal sufficiently to provide the necessary pressure to the brake lock to set the brakes. It is apparent that if the brakes are not adequately set to hold the vehicle, particularly when parked on an incline, there is likelihood of rupturing the discharge hose and nozzle which are connected to the consumer's tank during delivery or of rupturing the supply line to the truck tank during filling at the bulk plant if the truck moves from the tank to which it is connected. Such rupturing results in a fire hazard of quite serious potential. Also, the operator, after completing the delivery or filling operation, sometimes inadvertently forgets to close the main control valve which increases the possibility of gas leakage from the tank, particularly if the truck is involved in a highway accident and the external plumbing from the valve is damaged.

Because of the time involved in manually opening and closing the main outlet valve from the tank, many operators lock the valve permanently in an open position and depend solely on the nozzle control valve to prevent the escape of fluid from the tank between deliveries. In order to preclude exposure to the above described hazards, it is desirable automatically to control the main outlet valve in a convenient and fool-proof manner.

Therefore, it is an object of the present invention to provide an interlock mechanism between a vehicle brake system and a manually operable valve providing automatic control of the valve incident to brake manipulation.

Another object is to provide such an interlock mechanism which insures that the valve cannot be held in an open position when the brakes are released.

Another object is to provide an interlock mechanism which provides automatic closing of the valve upon release of the brakes.

Another object is to provide an interlock mechanism in a system of the character described which insures that sufficient force is exerted on the brake pedal to set the brakes in an applied position.

Other objects and advantages of the present invention will become more fully apparent in the following description in the specification.

Figure 1:
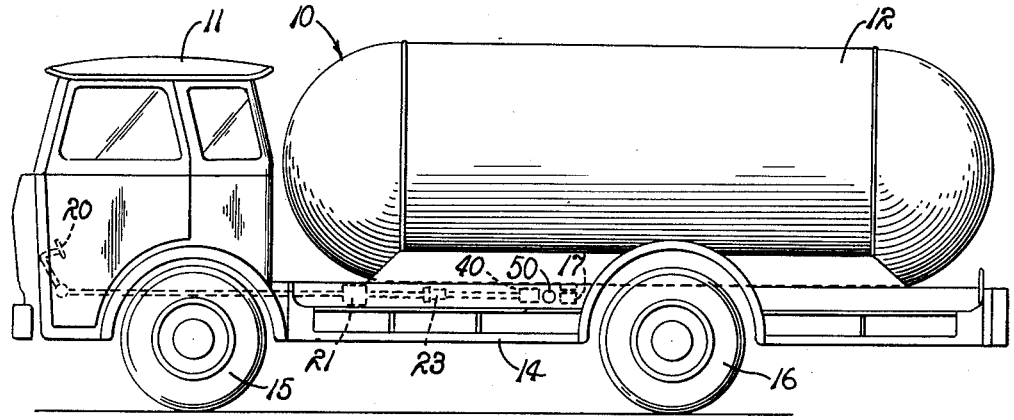
FIG. 1 is a side elevation of a liquid petroleum gas delivery truck incorporating the interlock mechanism of the present invention.

Referring more particularly to the drawings, a liquid petroleum gas delivery truck is generally indicated in FIG. 1 at 10 having a cab portion 11 and a tank 12 mounted on a chassis 14 which is supported on forward and rearward ground engaging wheels 15 and 16, respectively. A main outlet control valve 17 is screwthreadably received through a suitable opening in the bottom wall of the tank 12. The valve is of the internal opening type described in Patent No. 2,834,377 and includes a control handle 18 which is held in a valve closed position by a tension spring 19 mounted between the handle and the tank.

Figure 2:
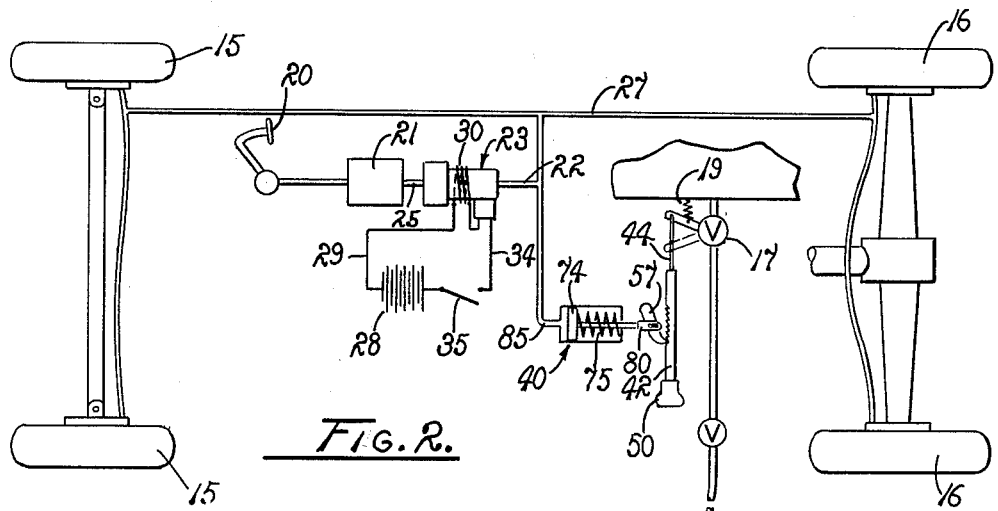
FIG. 2 is a schematic diagram of a brake system for the truck of FIG. 1 including the interlock mechanism of the present invention.
Figure 3:
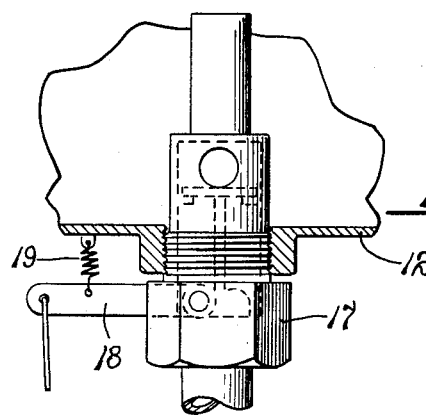
FIG. 3 is a side elevation of a main outlet valve from the tank of the truck of FIG. 1 which is controllable by the interlock mechanism of the present invention.
Figure 4:
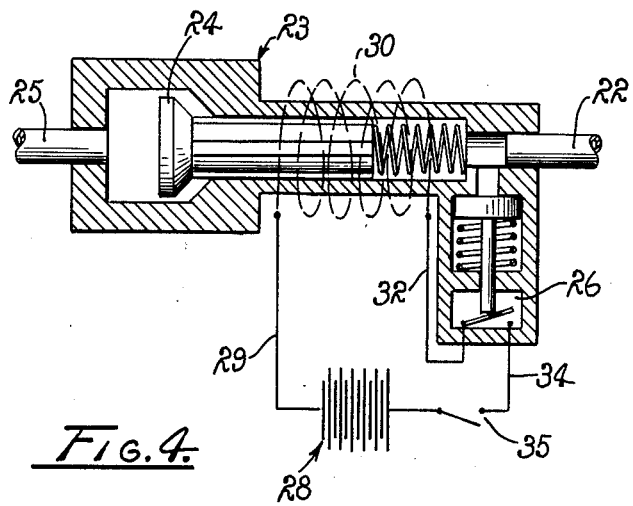
FIG. 4 is a schematic representation of a brake lock valve employed in the vehicle brake system of FIG. 2.

As best shown in FIG. 2, the truck employs a brake pedal and master cylinder 20 which is connected by suitable plumbing to a hydraulic power booster brake mechanism 21. Hydraulic fluid from the power booster is directed through an inlet line 22 of a brake lock valve, generally indicated by the reference numeral 23. The brake lock valve is best shown in FIG. 4 and includes a spring loaded check valve 24, an outlet line 25, and a pressure sensitive electrical switch 26. The discharge line 25 is connected to individual hydraulic wheel cylinders on the wheels 15 and 16 by a main supply line 27. A vehicle battery is schematically represented at 28 and provides a current conducting line 29 which is connected to a field coil 30 disposed about the spring loaded check 24. The opposite end of the coil is connected through a current conducting line 32 to one side of the pressure sensitive switch 26. The opposite side of the pressure switch is connected through a line 34 to one side of a manually operable switch 35 mounted on the dashboard of the cab portion 11 of the truck or in some other conveniently accessible location. The opposite side of the manual switch 35 is connected to the opposite pole of the battery 28 from the connection with the line 29. The valve 23 is shown in an open position to permit a flow of hydraulic fluid from the inlet line 22 through the check valve 24 and outwardly through the discharge line 25. Pressure developed in the inlet line is transmitted to the pressure sensitive switch 26 to close the contacts. If the manually actuated dash switch 35 is closed or in an "on" position, such closing of the switch 26 completes the circuit energizing the field coil 30 to close the check valve 24 against its spring and to prevent the return flow of fluid from the brakes thereby holding the brakes in an applied position. After the brake pedal 20 is released, fluid pressure in the inlet line 22 drops, causing the pressure sensitive switch 26 to open, interrupting current flow to the field coil 30. Fluid pressure in the discharge line 25 maintains the check valve 24 closed and the brakes applied. In order to release the brakes, the dash switch 35 is turned off to open its contacts and the brake pedal 20 is depressed to shift the check valve 23 to the open position of FIG. 4. Such action permits return flow of brake fluid from the discharge line 25 back through the valve.

The interlock mechanism embodying the principles of the present invention is indicated generally by the reference numeral 40. The mechanism includes an elongated control rod 42 having a substantially rigid outer end portion 43 and an inwardly extended flexible inner end portion 44 of reduced diameter. The rigid outer end portion of the rod provides a toothed rack segment 45 which is supported through a portion of the chassis 14 by an elongated tubular housing 47. The housing is held in such position by a pair of lock nuts 48 disposed on opposite sides of the chassis wall indicated at 49. A control knob 50 is carried on the outer rigid end 43 for reciprocating the rod within the housing 47. The inner flexible end 44 of the rod is secured to the control handle 18 of the main outlet control valve 17 so that during reciprocation of the rod the valve is actuated between open and closed positions.

The tubular housing 47 of the rod rigidly mounts an elongated housing or frame member 55 in substantially transversely outward extension therefrom within the chassis 14. A pawl or latch 57 is pivotally mounted at 58 on the frame 55 and has an opposite finger portion 59 engageable with the teeth of the rack segment 45 of the rod 42 through a suitable opening in the tubular housing 47. A transverse pin 60 is carried by the finger end portion of the pawl. A leaf spring 62 is rigidly mounted at one of its ends on the frame and provides an inwardly bent inner end 64 in slidable contact with the finger end of the pawl to urge the same into engagement with the tooth rack portion of the rod.

Figure 5:
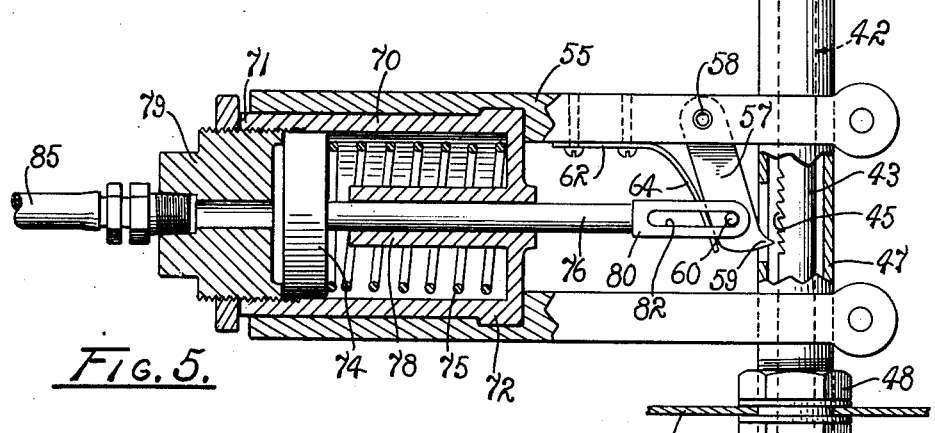
FIG. 5 is a partial sectional view of the interlock mechanism shown in a retracted valve closed position.

A single acting hydraulic cylinder 70 is rigidly mounted on the outer end of the frame 55 and has a head end 71 and a rod end 72. A piston 74 of a size preferably presenting a reaction surface of approximately one square inch is reciprocably mounted within the cylinder and is biased toward a retracted position adjacent to the head end of the cylinder by a compression spring 75 having a spring force of approximately 800 pounds per square inch. A rod 76 is concentrically mounted on the piston 74 to extend outwardly of the rod end of the cylinder through a cylindrical stop sleeve 78 carried by the head end of the cylinder to limit the stroke of the piston and extension of the rod. An adjustable stop member 79 is carried on the head end of the piston opposite to the rod to adjust the stroke of the piston. A bifurcated connector member 80 having a pair of transversely aligned elongated slots 82 therein is mounted on the end of the rod 67. The upper ends of the elongated slots 82 embrace the oppositely extended ends of the pin 60 to hold the pawl 57 out of engagement with the rack segment of the control rod 42. The head end of the cylinder is connected through a hydraulic line 85 to the main fluid supply line 26 of the brakes. With actuation of the brakes, the piston moves to the right, as viewed in FIG. 5, against the spring 75 to permit the pawl to engage the rack segment of the control rod, as in FIG. 6, under the urging of the leaf spring 62. The elongated slots 82 provide a lost-motion connection to accommodate movement of the pawl during ratcheting of the control rod.

*Operation*

The operation of the described embodiment of the subject invention is believed to be readily apparent and is briefly summarized at this point. When the liquid petroleum truck 10 is parked for delivering a supply of gas to a consumer or when it is parked for filling at a bulk supply station, it is required that the brakes of the vehicle be set in an applied position to prevent inadvertent movement of the truck relative to the tank, to which it is connected. In setting the brakes, the dash switch 35 is first actuated to an "on," or contact closed position, and the brake pedal 20 is depressed to provide a flow of hydraulic fluid through the brake lock valve 23 to the individual wheel cylinders. The increase in line pressure is felt by the pressure sensitive switch 26 of the locking valve to close the contacts thereof and to complete the electrical circuit to the field coil 30. The check valve of the brake lock is seated to the right, as viewed in FIG. 4, by the energized field coil to block the back flow of fluid from the brakes thereby holding the brakes in an applied position after release of the brake pedal 20. The pressure in the main brake supply line 27 is also directed to the head end of the cylinder 70 by the hydraulic line 85. During depression of the brake pedal 20 to apply the brakes, the 800 lbs. per sq. inch force of the cylinder spring 75 acts against the force applied to the brake pedal so that such spring force must be overcome before the brakes are set. With movement of the piston 74 to the right against the spring 75, the rod 76 and connector member 80 are positioned to allow the pawl 57 to engage the rack segment of the control rod 42 by the leaf spring 62. The operator then dismounts from the cab 11 of the truck and actuates the knob 50 of the control rod outwardly of the truck to open the main supply valve 17 against the return spring 19. During such movement of the control rod, the pawl 57 is permitted to ratchet past the rack segment of the rod with the slots 82 in the bifurcated connector member 80 accommodating such ratcheting movement of the pin 60 therethrough. It is readily apparent that if the operator does not apply sufficient force to the brake pedal to overcome the spring 75 within the cylinder to provide enough pressure to the pressure sensitive switch 26 in the brake lock valve 23, the pawl 57 will remain in the retracted position of FIG. 5. In such position, when the operator opens the main control valve 17 by manual actuation of the control rod outwardly of the truck and removes his hand from the knob 50, the spring 19 automatically returns the rod and closes the valve. The result is that the operator is immediately made aware that the brakes of the vehicle are not properly applied to prevent coasting of the vehicle during delivery.

Figure 6:
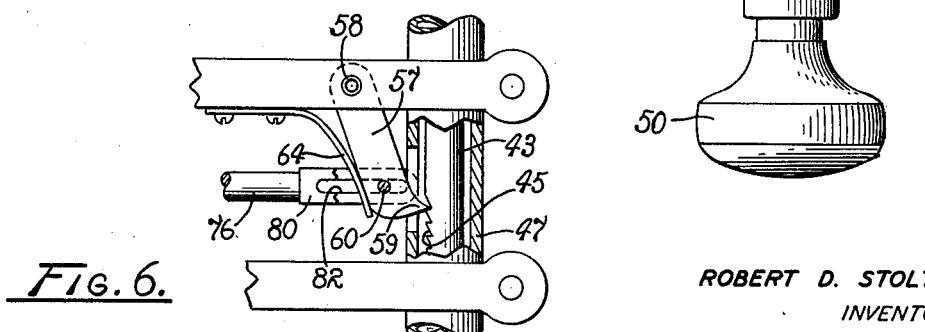
FIG. 6 is a fragmentary elevation of the latch portion of the interlock mechanism of FIG. 5 but shown in a latched valve open position.

If the brake pedal 20 has been properly depressed and the pawl is disposed in the engaged position of FIG. 6, the pawl thereby maintains the control handle and main valve 17 in an open position. After completing delivery, the operator need only return to the cab portion of the vehicle to turn off the dash switch 35 to de-energize the field coil 30. To relieve the pressure still present in the brake lines, the brake pedal 20 is again depressed to open the check valve 24 to permit return flow of the brake fluid trapped in the individual cylinders. At the same time, the cylinder spring 75 returns the piston 74 to the left to the position of FIG. 5 which action causes the connector member 80 to pivot the pawl 57 out of engagement with the rack segment of the control rod against the leaf spring 62. Upon disengagement of the pawl from the teeth, the return spring 19 on the control handle 18 automatically shifts the control 42 inwardly of the vehicle to close the main control valve 17. In this way, the control valve 17 is automatically closed without further attention by the operator upon release of the brakes.

From the foregoing, it is readily apparent that the interlock mechanism of the present invention provides improved automatic control of the main outlet valve from the tank of a gas delivery truck. The novel manner in which the interlock mechanism is associated with the brake system of such trucks insures that the outlet valve cannot be held in an open position until a sufficient force has been applied to the brake pedal positively to set the brakes in an applied position. Also, the interlock mechanism of the present invention provides automatic closing of the outlet valve from the tank upon release of the brakes after delivery to preclude leakage of fluid from the tank between delivery stops. Such automatic closure of the valve further insures that no leakage will occur from the tank in such instances of accidental damage to the exposed external plumbing on the vehicle.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An interlock mechanism, between a first controllable member movable to and from first and second positions having a latch receiving segment, and a second controllable member having first and second positions, comprising first resilient means connected to and biasing said first controllable member to its first position, latch means registered with said latch receiving segment of said first controllable member, second resilient means engaging said latch means to urge the same into engagement with said latch receiving segment of the first controllable member, powered means operable incident to actuation of said second controllable member from its first to its second position, and connector means mounted on said powered means providing a lost-motion connection with said latch means to permit ratcheting of the latch means relative to said latch receiving segment during movement of said first controllable member from its first to its second position, and to retract said latch means from said latch receiving segment of the first controllable member incident to movement of said second controllable member from its second to its first position to allow said first resilient means automatically to return said first controllable member to its first position.

2. An interlock mechanism, between an operable element having open and closed positions and a vehicle brake system having a manually controllable parking brake actuating device therein adapted to maintain the brakes in an applied position, comprising mounting means on the vehicle, an elongated control member manually reciprocable in the mounting means and having a rack segment and an end coupled to said operable element, first resilient means connected to and biasing said operable element to said closed position, latch means pivoted on the mounting means in registry with said rack segment of said control member, second resilient means supported on said mounting means contacting said latch means to urge the same into engagement with said rack segment of the control member, powered means operable incident to manipulation of said parking brake actuating device, said powered means being supported on the mounting means, and connector means mounted on said power means providing a lost-motion connection with said latch means to permit ratcheting of the latch means relative to said rack segment during movement of said control member to actuate said operable element to the open position, and to retract said latch means from said rack segment of the control member incident to releasing said parking brake actuating device to allow said first resilient means automatically to return said operable element to its closed position.

3. In a brake system for a fluid dispensing tank truck having a main frame, a main outlet valve including a control handle mounted on the frame, a spring connected to the handle biasing the same to a closed position, said brake system providing an operator pedal, a brake locking device, and a brake line; an interlock mechanism connected to said valve control handle comprising an elongated rod having a handle and a plurality of rack teeth thereon; a power cylinder having an extendable piston rod and an opposite head end; an auxiliary frame mounted on said main frame mounting said cylinder in spaced substantially transversely aligned relation to said rod; conduit means connecting said head end of the cylinder to said brake line; a compression spring disposed within said cylinder biasing said piston rod to a retracted position; a pawl pivotally mounted on said auxiliary frame; a leaf spring mounted on said auxiliary frame contacting the pawl and urging the same toward engagement with said teeth on the rod; and a connector member mounted on the rod of said power cylinder providing a lost-motion connection between said rod of the cylinder and the pawl eccentrically of its pivotal connection on the auxiliary frame to permit ratcheting of the pawl relative to said teeth during rod movement to open said tank outlet valve and thereafter precluding movement in the opposite direction prior to retraction of the brakes whereupon said cylinder spring retracts said piston rod and pawl to permit said valve handle spring to close the valve.

4. An interlock mechanism, between a first controllable member movable to and from first and second positions and having a latch receiving segment, and a second controllable member having first and second positions, comprising first resilient means connected to and biasing said first controllable member to its first position, latch means registered with said latch receiving segment of said first controllable member, second resilient means engaging said latch means to urge the same into engagement with said latch receiving segment of the first controllable member, and means connecting the second controllable member with the latch means and providing a lost-motion connection with said latch means to permit ratcheting of the latch means relative to said latch receiving segment while the second controllable member is disposed in its second position and during movement of said first controllable member from its first to its second position, and to retract said latch means from said latch receiving segment of the first controllable member incident to movement of said second controllable member from its second to its first position to allow said first resilient means automatically to return said first controllable member to its first position.

5. An interlock mechanism between a first controllable member movable to and from first and second positions and having a notched latch-receiving segment, and a second controllable member having first and second positions, said mechanism being mounted on a frame and comprising a spring connected to the frame and biasing said first controllable member to its first position; a latch mounted on the frame in spaced relation to the latch-receiving segment of the first controllable member and adapted to pivot toward the latch-receiving segment for locking engagement therewith when the first controllable member is in its second position; a spring mounted on the frame and engaging the latch to urge the same into engagement with the latch-receiving segment; a reciprocating powered member mounted on the frame and adapted to reciprocate successively toward and away from the latch incident to movement of the second controllable member into its second and first positions respectively, said powered member being connected to the latch by a lost-motion connection allowing independent motion of the latch for a predetermined distance to permit ratcheting of the latch relative to the latch-receiving segment while the second controllable member is disposed in its second position and the first controllable member is moving from its first to its second position, said lost-motion connection permitting retraction of the latch from the latch-receiving segment of the first controllable member incident to movement of the second controllable member from its second to its first position to allow the spring for the first controllable member automatically to return said member to its first position.

6. An interlock mechanism, between a first controllable member movable to and from first and second positions and having a plurality of rack teeth disposed in coplanar relationship thereon, and a second controllable member having first and second positions, comprising a frame; a spring connected to the frame and biasing the first controllable member to its first position; an elongated pawl mounted on the frame for pivotal movement thereon coplanar with said rack teeth, said pawl extending away from the first position of said first controllable member in the direction of the second position thereof and obliquely toward the rack teeth in coplanar relationship with said teeth alternately to engage and to disengage from the teeth; a spring connected to the frame and engaging the latch to urge the same into engagement with the rack teeth; a reciprocative powered member mounted on the frame and adapted to reciprocate successively toward and away from the latch incident to movement of the second controllable member into its second and first positions respectively, said powered member being connected to the latch by a lost-motion connection allowing independent motion of the latch for a predetermined distance to permit ratcheting of the latch relative to the rack teeth while the first controllable member is moving from its first to its second position, said lost-motion connection permitting retraction of the latch from the rack teeth incident to movement of the second controllable member from its second to its first position to allow the spring for the first controllable member automatically to return said member to its first position.

References Cited by the Examiner
UNITED STATES PATENTS 2,703,990 3/55 Stricklin _____ 192—3 X
2,959,261 11/60 Hemphill _____ 192—3

OTHER REFERENCES

Cadillac Shop Manual, 1961, page 8-2.

M. CARY NELSON, *Primary Examiner.*